United States Patent
Petrick et al.

[11] Patent Number: 5,920,889
[45] Date of Patent: Jul. 6, 1999

[54] APPARATUS AND METHOD FOR WRITE MISS PROCESSING IN A COPY-BACK DATA CACHE WITH AN ALLOCATING LOAD BUFFER AND A NON-ALLOCATING STORE BUFFER

[75] Inventors: Bruce Petrick, Sunnyvale; Dale Greenley, Los Gatos, both of Calif.

[73] Assignee: Sun Microsystems, Inc., Palo Alto, Calif.

[21] Appl. No.: 08/883,863

[22] Filed: Jun. 27, 1997

[51] Int. Cl.⁶ .................................................. G06F 12/00
[52] U.S. Cl. ........................ 711/143; 711/135; 711/137; 711/140; 711/154; 711/158; 711/126
[58] Field of Search ..................... 711/143, 135, 711/137, 140, 154, 158, 126

[56] References Cited

U.S. PATENT DOCUMENTS

| | | | |
|---|---|---|---|
| 5,197,144 | 3/1993 | Edenfield et al. | 711/143 |
| 5,761,712 | 6/1998 | Tran et al. | 711/126 |
| 5,809,530 | 9/1998 | Samra et al. | 711/140 |
| 5,848,433 | 12/1998 | Tran et al. | 711/137 |

OTHER PUBLICATIONS

Chen and Baer, "A Performance Study of Software and Hardware Data Prefetching Schemes", *Proceedings of the IEEE*, pp. 223–232 (1994).

*Primary Examiner*—John W. Cabeca
*Assistant Examiner*—Nasser Moazzami
*Attorney, Agent, or Firm*—William Galliani; Pennie & Edmonds LLP

[57] ABSTRACT

An apparatus for processing a write miss signal from a copy-back data cache includes a load-store unit with an allocating load buffer, a non-allocating store buffer, and a priority control circuit to generate write-after-read hazards and read-after-write hazards to preserve the processing priority of entries within the allocating load buffer and the non-allocating store buffer. A prefetch circuit enqueues a prefetch command in the allocating load buffer and a store command in the non-allocating store buffer upon a write miss to the copy-back data cache. Thus, the priority control circuit forces a write-after-read hazard on the store command in the non-allocating store buffer. As a result, the prefetch command in the allocating load buffer secures an allocated line in the copy-back data cache, allowing the store command of the non-allocating store buffer to write data to the allocated line.

12 Claims, 4 Drawing Sheets

APPARATUS AND METHOD FOR WRITE MISS PROCESSING IN A COPY-BACK DATA CACHE WITH AN ALLOCATING LOAD BUFFER AND A NON-ALLOCATING STORE BUFFER

BRIEF DESCRIPTION OF THE INVENTION

This invention relates generally to computer cache memories. More particularly, this invention relates to a technique for processing copy-back data cache write misses so that a non-allocating store buffer can operate to write data into the cache.

BACKGROUND OF THE INVENTION

FIG. 1 is an illustration of a general purpose computer 10. The computer 10 includes a central processing unit (CPU) 12. The CPU 12 includes execution units 14, such as a floating point unit, an integer execution unit, etc.

The instruction unit 16 of the CPU 12 reads instructions from a computer program. Each instruction is located at a memory address. Similarly, the data associated with an instruction is located at a memory address. The CPU 12 accesses a specified memory address to fetch the instruction or data stored there.

Most CPUs include an on-board memory called an internal cache 18. The internal cache 18 of FIG. 1 includes a data cache 20, an instruction cache (not shown), and a load/store unit 22. The load/store unit 22 includes a load buffer 24, a store buffer 26, and a priority control circuit in the form of a write-after-read (WAR)/read-after-write (RAW) circuit. These elements will be discussed below. Attention presently focuses on a more general discussion of the processing of addresses associated with instructions or data of a computer program executed by CPU 12.

If a specified address is not in the internal, or L1, cache 18, then the CPU 12 looks for the specified address in an external cache, also called an L2 cache 30. The external cache 30 has an associated external cache controller 28, which may be internal to the CPU 12 or external to the CPU 12.

If the address is not in the external cache 30 (a cache miss), then the primary memory 34 is searched for the address. The primary memory 34 has an associated primary memory controller 32, which may be internal to the CPU 12 or external to the CPU 12.

If the address is not in primary memory 34, then the CPU 12 requests access to the system bus 36. The system bus 36 is used to access secondary memory 40 through an input/output controller 38.

The foregoing discussion of a typical memory hierarchy in a computer makes apparent the desirability of finding an address within the internal cache 18. In the absence of a "hit" in the internal cache, the address must be located in the external cache 30. This operation takes more time. Similarly, if the address cannot be found in the external cache 30, then it must be sought in the primary memory 34. This operation is also time consuming. Finally, if the address cannot be found in primary memory 34, then it must be secured from secondary memory 40. Access to secondary memory 40 is particularly time consuming. Therefore, it is highly desirable to have a high "hit" rate in the internal cache 18 of a CPU 12.

FIG. 1 also depicts additional devices connected to the system bus 36. For example, FIG. 1 illustrates an input/output controller 42 operating as an interface between a graphics device 44 and the system bus 36. In addition, the figure illustrates an input/output controller 46 operating as an interface between a network connection circuit 44 and the system bus 36.

The overall computer architecture associated with the present invention has now been described in the context of a similar prior art device. In addition, the prior art problem of fetching memory addresses has been described. The foregoing discussion has also set forth the importance of the performance of the internal cache 18 to the overall performance of the CPU 12. Attention presently turns to a more particular discussion of the operation of the prior art internal cache 18.

As known in the art, cache memories store addresses and corresponding instructions or data that are expected to be used by the CPU execution units 14 in the near future. For example, if the CPU execution units 14 perform a calculation, the result of the calculation will generally be expected to be used again in the near future. Thus, the result of that calculation, referred to here as data, will be stored at a specified memory address. The CPU execution units 14 will attempt to store the data in the data cache 20 of the internal cache 18. If space does not exist in the data cache 20, the data is written to the external cache 30.

As indicated above, the internal cache 18 has a load/store unit 22, with a load buffer 24 and a store buffer 26. As known in the art, the load buffer may be used to store prefetch load commands. In other words, in the instruction unit 16, using techniques known in the art, may generate a prefetch load command, which is enqueued in the load buffer 24. The prefetch load command is then used to fetch the data corresponding to the address specified in the prefetch load command. The data is loaded into the data cache 20 in the anticipation that it will be subsequently used by the CPU execution units 14. The present invention is directed toward prior art circuit architectures of the type wherein the load buffer 24 is capable of allocating or reserving a data line in the data cache 20.

The store buffer 26 of the load/store unit 22 is used to store addresses and data that are to be returned to the primary memory 34, the external cache 30, or the internal cache 18, if a hit. Given this functionality, the prior art store buffers 26 of relevance to the present invention are non-allocating. That is, unlike the allocating load buffer 24, the store buffer 26 does not allocate a line in the data cache 20.

The operation of the load buffer 24 and store buffer 26 must be supervised by a priority control circuit 27. The priority control circuit 27 is implemented as write-after-read/read-after-write (WAR/RAW) circuit 27. The WAR/RAW circuit 27 operates to preserve the processing priority of entries within the load/store unit 22. For example, a load to the same address as a previous store must be prevented from executing first.

The priority control circuit issues two types of hazards to insure proper program execution. The first type of hazard is called a read-after-write (RAW) hazard. A RAW hazard is used on load buffer 24 entries so that the load buffer 24 does not read data from the data cache 20 or primary memory 34 until the store buffer 26 writes data to the data cache 20 or primary memory 34. After this write operation by the store buffer 26, the load buffer 24 can perform its read operation.

The second type of hazard is called a write-after-read (WAR) hazard. A WAR hazard is placed on a store buffer 26 entry so that the store buffer 26 does not write data to the data cache 20, the external cache 30, or primary memory 34 until the load buffer 24 reads from the data cache 20, the external cache 30, or primary memory 34. This read operation allocates a line in the data cache 20 on misses. After the read operation by the load buffer 24, the store buffer 26 can perform its write operation.

Complex priority control circuits 27 exist in the prior art to implement these WAR/RAW operations. It would be highly desirable to use, without modification, these complex prior art priority control circuits 27 in different circuit architectures. For example, if the external cache 30 of the system of FIG. 1 was eliminated, then an alternate mechanism would be required to return data to memory in the event of a data cache write miss. One approach to solving this problem would be to supply a copy-back data cache. It would be desirable to use an existing architecture to implement the copy-back data cache. However, as indicated above, a problem with the architecture of the apparatus of FIG. 1 is that the store buffer 26 is non-allocating. That is, it does not allocate into the data cache 20. To implement a copy-back data cache, the store buffer can be made allocating. However, this would require that the priority control circuit 27 be re-designed. As indicated above, the priority control circuit is rather complex, and therefore it would be desirable to identify a technique of using the circuit without modification.

In sum, it would be highly desirable to exploit an allocating load buffer, non-allocating store buffer, and priority control circuit of a prior art load store unit to implement a copy-back data cache. The copy-back data cache could be used in a low-cost system without an external cache.

SUMMARY OF THE INVENTION

An apparatus for processing a write miss signal from a copy-back data cache includes a load-store unit with an allocating load buffer, a non-allocating store buffer, and a priority control circuit to generate write-after-read hazards and read-after-write hazards to preserve the processing priority of entries within the allocating load buffer and the non-allocating store buffer. A prefetch circuit enqueues a prefetch command in the allocating load buffer and a store command in the non-allocating store buffer upon a write miss to the copy-back data cache. Thus, the priority control circuit forces a write-after-read hazard on the store command in the non-allocating store buffer. As a result, the prefetch command in the allocating load buffer secures an allocated line in the copy-back data cache, allowing the store command of the non-allocating store buffer to write data to the allocated line.

The technique of the invention allows a non-allocating store buffer to effectively allocate a copy-back data cache. This is achieved without altering the complex logic associated with prior art priority control circuits. Instead, the operation of prior art priority control circuits is exploited through the load prefetch to the allocating load buffer to obtain the desired functionality. Thus, prior art architectures can be modified to include this load prefetch and thereby yield a non-allocating store buffer that is capable of copy-back data cache store allocations. The invention is ideally suited for lower-cost computer systems that do not include an external cache memory that would typically be used to process a data cache write miss.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
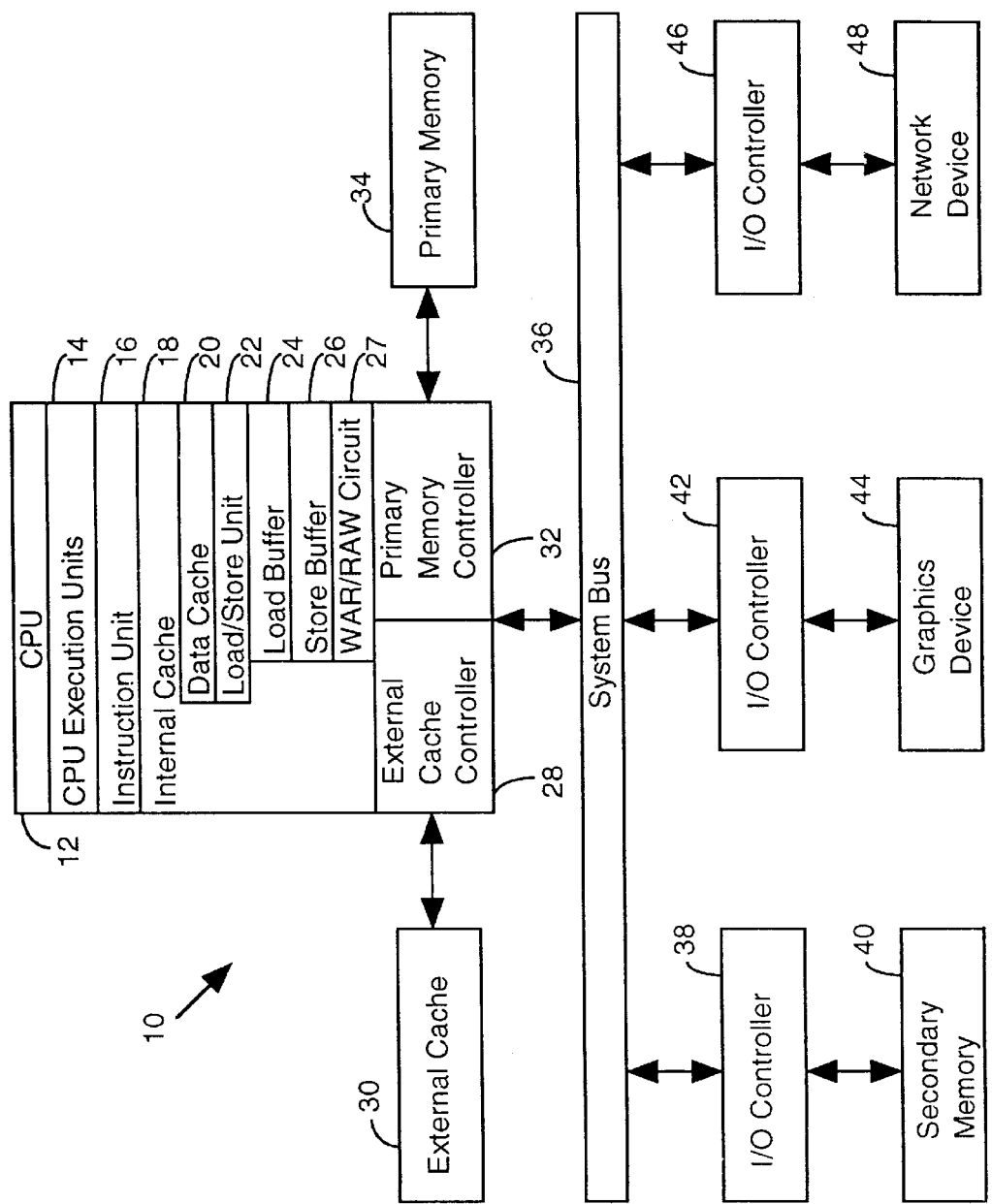
FIG. 1 illustrates a general purpose computer constructed in accordance with the prior art.
Figure 2:
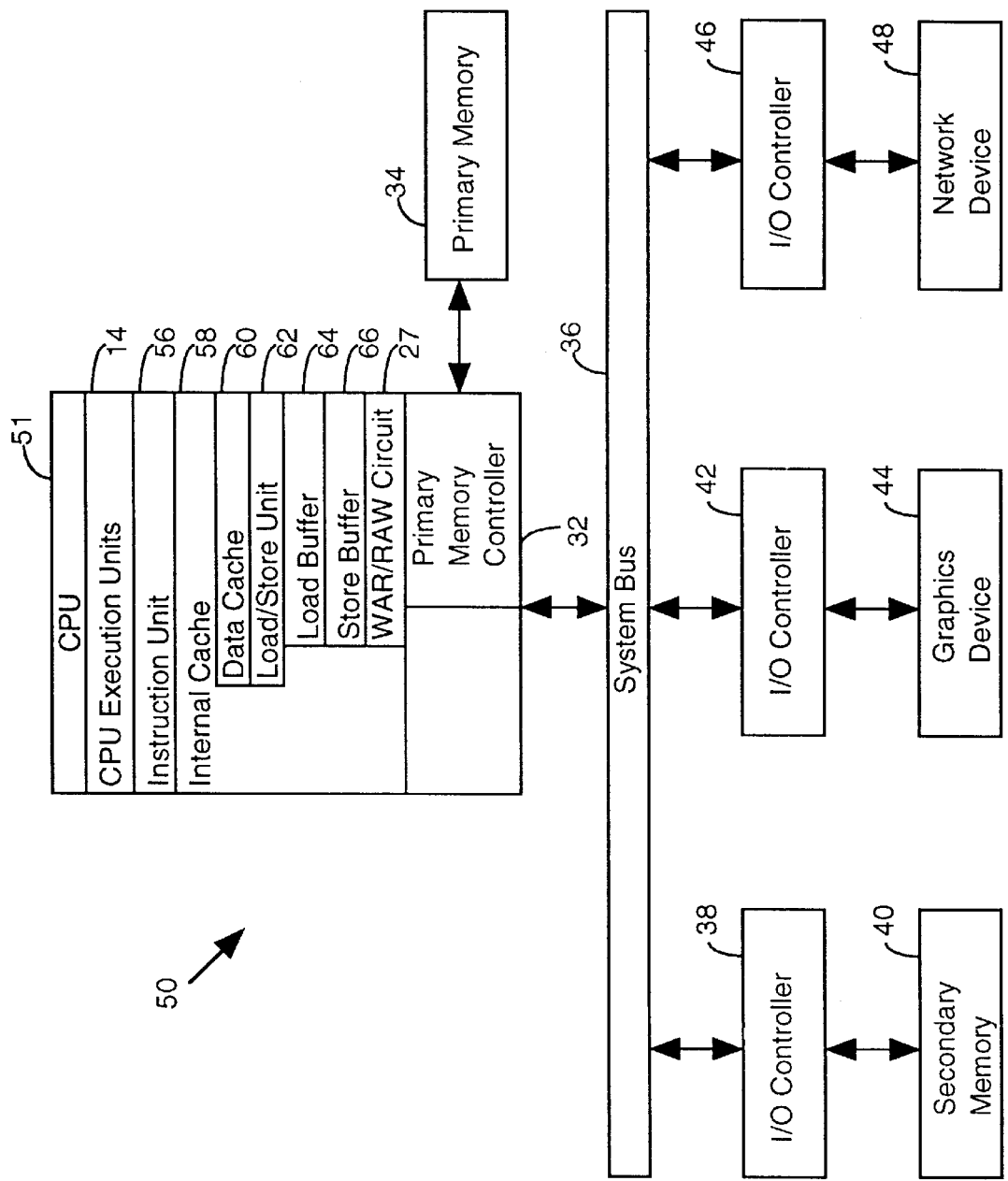
FIG. 2 illustrates a general purpose computer constructed in accordance with an embodiment of the invention.

FIG. 2 illustrates a computer 50 constructed in accordance with an embodiment of the present invention. The computer 50 includes a CPU 51, which generally corresponds to the CPU 12 of FIG. 1, with the exception of a couple of important distinctions. First, the instruction unit 56 is constructed to issue prefetch load commands to the load buffer 64 when a store command is sent to the store buffer 66. This operation will be discussed in detail below. Another noteworthy distinction between the prior art CPU 12 of FIG. 1 and the CPU 51 of FIG. 2 is that the CPU 51 of the present invention does not have an associated external cache. Thus, the CPU 51 does not have an associated external cache controller either internal or external to the chip. Since the CPU 51 does not have an associated external cache, it may be used in lower cost systems, such as embedded systems.

Since the apparatus of FIG. 2 does not have an external cache, write misses to the data cache 60 of the internal cache 58 cannot be returned to the external cache, as commonly done in the prior art. Instead, a new mechanism must be used to return data to memory in the event of write misses to the data cache.

The present invention relies upon a copy-back data cache 60 to return data to memory. As known in the art, a copy-back data cache uses a "dirty bit" to signify when the contents of the data in the copy-back data cache have been changed. If the dirty bit is set, then the copy-back data cache 60 must update the primary memory 34 so that the primary memory 34 is consistent with the data in the copy-back data cache 60. In other words, the copy-back data cache 60 must write the contents of an evicted data word back to primary memory 34 before allowing a new data entry to overwrite the evicted data word. Copy-back data caches are generally known in the art. Thus, techniques for evicting data from such a cache and returning the evicted data to primary memory are known in the art. The present invention may be implemented using these prior art techniques.

Any number of techniques may be used to evict data from the copy-back data cache 60. The present invention is directed toward the loading of data into the data cache 60. In particular, the invention is directed toward the use of a load/store unit 62 with an allocating load buffer 64, a non-allocating store buffer 66, and a priority control circuit 27, which may be used to allocate data from the non-allocating store buffer 66 into the data cache 60. This operation is performed through the use of a prefetch load command issued to the load buffer 64.

Figure 3:
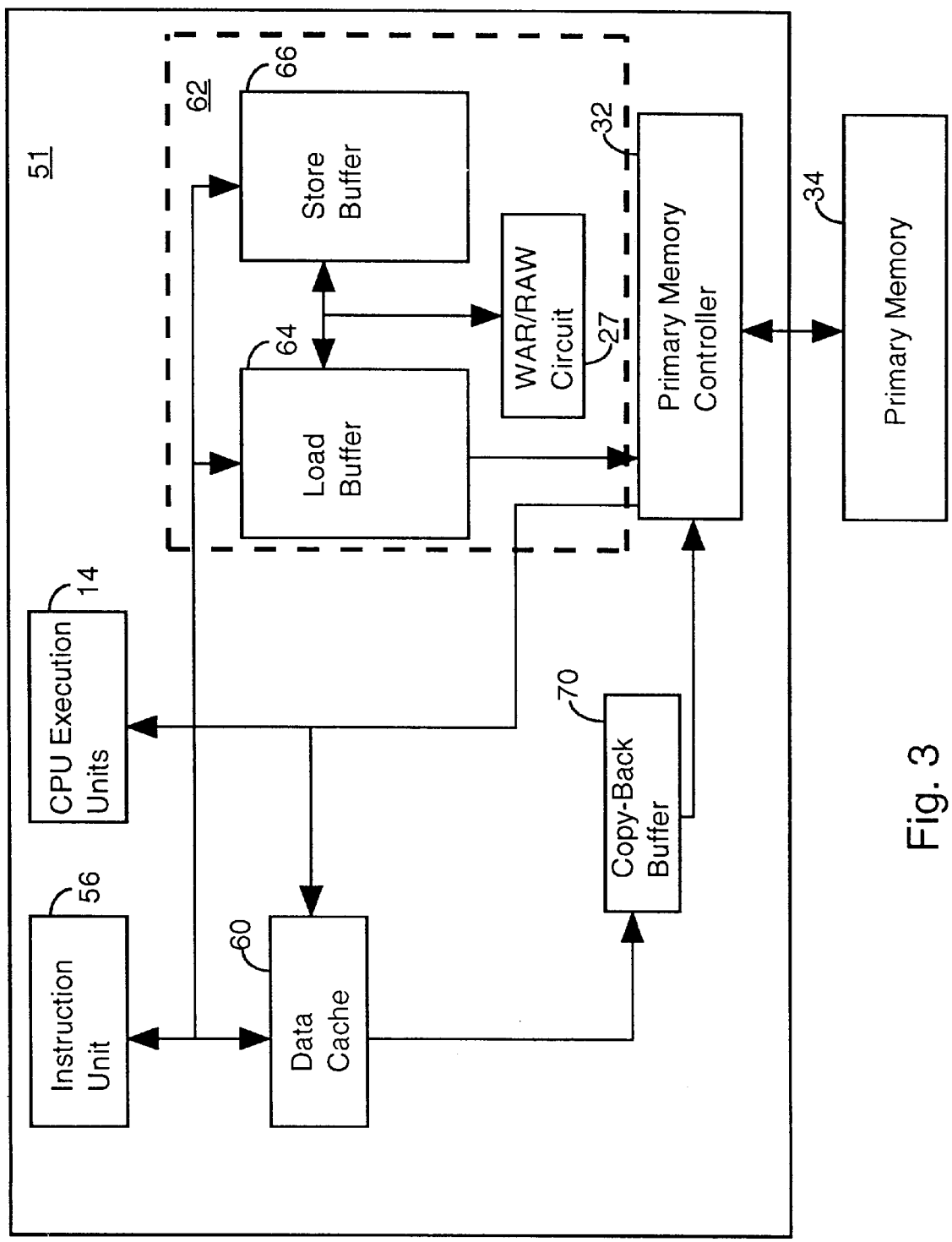
FIG. 3 illustrates a central processing unit constructed in accordance with an embodiment of the invention.
Figure 4:
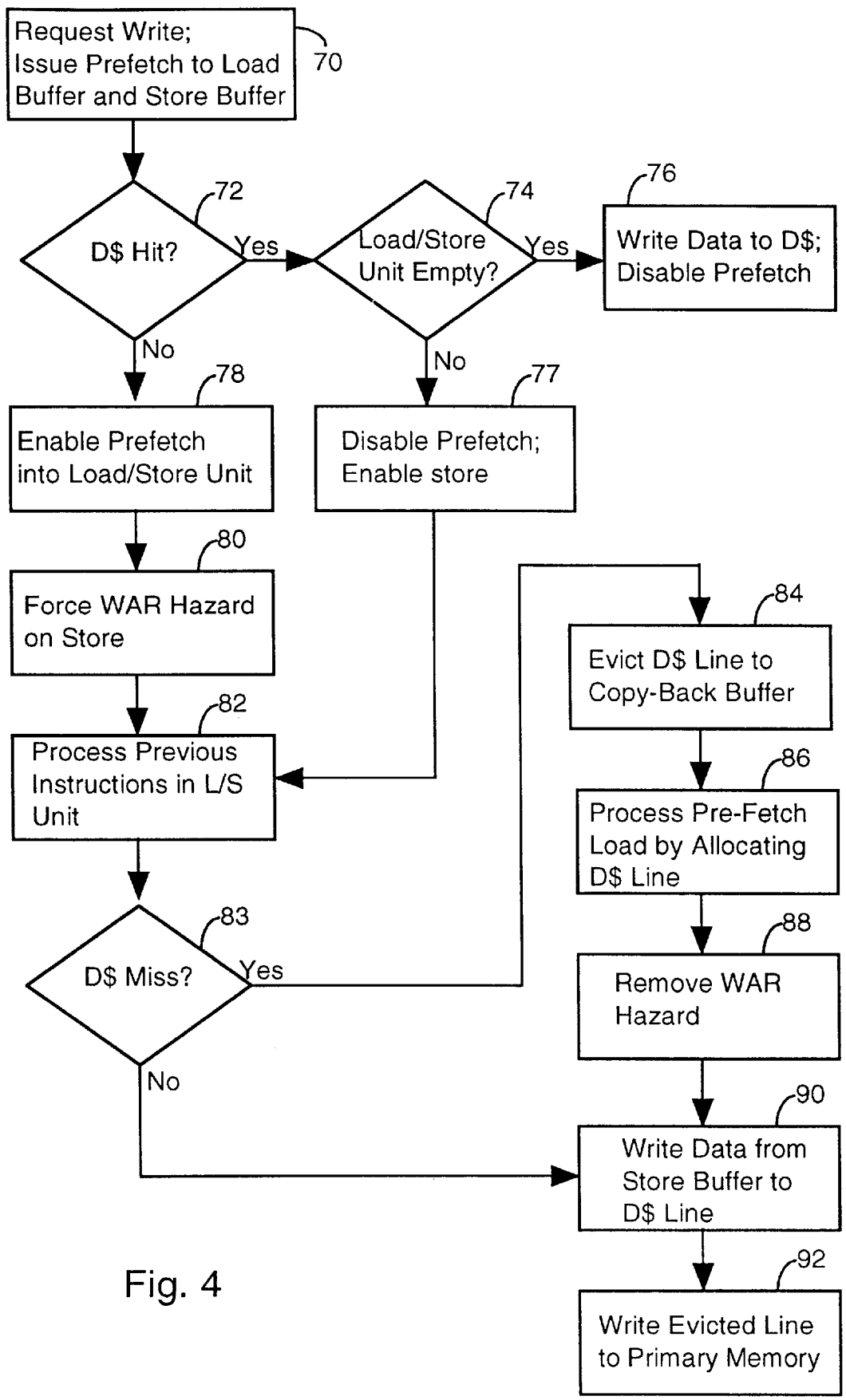
FIG. 4 illustrates central processing unit processing operations in accordance with an embodiment of the invention.

FIG. 3 illustrates a portion of a CPU 51 constructed in accordance with an embodiment of the invention. The figure illustrates an instruction unit 56. The instruction unit 56 is constructed to issue a store command to the non-allocating store buffer 66 and a prefetch load command to the allocating load buffer 64 in order to implement a write request. FIG. 4 illustrates this operation as being a first processing step (step 70) associated with an embodiment of the invention.

The next processing step shown in FIG. 4 is to determine whether a D$ hit occurred (step 72). The data cache hit signal is provided by the data cache 60, using standard techniques. If a data cache hit exists (the specified address is in the data cache 60), then it is determined whether the load/store unit 62 is empty (step 74). If the load/store unit 62 is empty, there is no concern regarding the proper order of execution of previous instructions. Thus, the data sent to the store buffer 62 can be immediately sent to the data cache 60. Step 76 also entails disabling the prefetch initiated in step 70 because the prefetch will not be required to allocate the data cache 60. By way of example, the prefetch may be disabled by using the data cache write hit signal from the data cache 60 to disable the loading of the prefetch command into the load/store unit 62. A pipeline for implementing such a strategy is discussed below.

If the load/store unit is not empty, then the prefetch is disabled and the store buffer stores the store command (step 77). The prefetch is disabled because there is a cache hit and therefore the prefetch is not required to allocate the data cache 60.

If there is a data cache miss, as tested at step 72, then the previously issued prefetches to the load/store unit 62 are enqueued (step 78). This operation results in the priority control circuit 27 forcing a write-after-read (WAR) hazard on the store command (step 80). As schematically shown in FIG. 3, the WAR/RAW circuit 27 monitors the contents of the allocating load buffer 64 and the non-allocating store buffer 66 to preserve the priority of entries within the two buffers. In accordance with the invention, a prior art priority control circuit 27 may be used for this purpose. The present invention is implemented to exploit the functionality of prior art priority control circuits 27. As indicated above, the prefetch load command and the store command are enqueued upon a data cache write miss. The store command includes an address and data, while the prefetch load command includes the same address as the store command. This forces the priority control circuit 27 to issue a WAR hazard on the store command, insuring that the store command is executed after the prefetch load command, as discussed further below.

Returning to FIG. 4, the next processing step is to process previous instructions in the load/store unit 62 (step 82). Then, the store command or prefetch load command will be processed. At this time it is determined whether a data cache miss occurred. If a data cache miss did not occur (a cache hit), then the data cache line is allocated and data can be written from the store buffer to the allocated data cache line (step 90). In the case of a data cache miss, the prefetch load command can only load data into the data cache 60 if another data line is evicted. Thus, the next processing step shown in FIG. 4 is to evict a dirty data cache line to a copy-back buffer (step 84). If the data cache line is not dirty (its values are consistent with those in primary memory), then the data cache line can be simply overwritten, without using the copy-back buffer. FIG. 3 schematically illustrates the relation between the data cache 60, the copy-back buffer 70, and the primary memory controller 32.

The eviction of a line from the data cache 60 allows the allocating load buffer 64 to allocate data into the data cache 60 (step 86). A line in the data cache 60 can now be written to. When a line in the data cache 60 becomes available in a non-prefetch situation, the line is filled from the primary memory 34, while the data is passed directly to the CPU execution units 14. FIG. 3 schematically illustrates this operation via the primary memory controller 32. In this case, a prefetch is involved so data is not passed to the CPU execution units 14. Instead, the data is passed only to the data cache 60.

The processing of the prefetch load command results in the removal of the WAR hazard on the store command in the non-allocating store buffer 66 (step 88). At this time, the store buffer 66 recognizes that the prefetch load command has allocated the address associated with the store command. Thus, the store buffer 66 writes its data directly to the allocated line in the data cache 60 (step 90). At this point, the data from the store command has been loaded into the data cache 60 via the non-allocating store buffer 66. When convenient, the copy-back buffer 70 may be emptied by writing the evicted line from the data cache 60 to primary memory 34 (step 92).

The invention has now been fully described. The technique of the invention allows a non-allocating store buffer 66 to effectively allocate a copy-back data cache 60. This is achieved without altering the complex logic associated with prior art priority control circuits 27. Instead, the operation of prior art priority control circuits is exploited through the load prefetch to the allocating load buffer to obtain the desired functionality. Thus, prior art architectures can be modified to include this load prefetch and thereby yield a non-allocating store buffer 66 that is capable of copy-back data cache store allocations. The invention is ideally suited for lower-cost computer systems that do not include an external cache memory that would typically be used to process a data cache write miss.

Although the invention has been fully described, attention still turns to a discussion of an exemplary implementation of the apparatus and method of the invention so that the invention can be more fully appreciated.

The following is a partial window of pipeline stages in the ULTRASPARC microprocessor, sold by SUN MICROSYSTEMS, INC., Mountain View, Calif.:

Stage G
   issue instruction
Stage E
   integer execution
   address calculation
Stage C
   load/store data cache and data cache tag access
   TLB access (allows D$ hit determination in following cycle)
Stage N1
   determine D$ hit/miss
   load/store, hit/miss determination
   return data on hit Instructions are issued in the G stage, integer instructions are executed in the E stage, and any load/store addresses are calculated in the E stage. The data cache and the data cache tags are accessed in the C stage and a hit/miss is determined in the N1 stage. A load, for example, will issue in the G stage, the address is calculated in the E stage, access to the data cache and data cache tags is achieved in the C stage and if a hit occurs, it will return data in the N1 stage. If a miss occurs, the load will get enqueued on the load buffer. As the load is enqueued, its address is checked against all stores in the store buffer and if there is a match then this particular load has a RAW hazard set by the priority control circuit. As a result, the load waits until the store to the same location is completed. The load buffer also maintains in hardware a hit bit associated with each entry, and as loads enter the load buffer they check previous loads, if the new load is a miss, a previous load to the same data cache line will have brought the data in, therefore when this load actually executes, it will be a hit, not a miss. Loads which miss on the data cache will return data to the requested register and at the same time update the data cache.

Stores follow the same pipeline stages. Each store checks its address against all of the loads, and if a match exists, then a WAR hazard is logged in the store buffer, and the store waits for the matched load to finish before storing its data.

As indicated above, in accordance with the invention, all data cacheable stores are accompanied by a prefetch load command. The store command and the prefetch load command are enqueued in the case of a data cache write miss. Each store is issued from the instruction unit 56 with a prefetch to the load buffer and a store to the store buffer to the same address, This is feasible since the load/store unit pipe issues one memory operation per cycle. The virtual address is checked in the C stage and the adjusted hit bit is calculated as usual in the load buffer. If it is a hit, the prefetch will not be enqueued on the load buffer. If it is a miss, the prefetch is enqueued with a WAR hazard on the store. When the prefetch is then dequeued, the WAR hazard is removed on the store and it can then store to the data cache, as discussed above.

In the case of a snoop hit, the load/store unit 62 may be flushed. In the case of a snoop miss, nothing is done.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above disclosure. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A circuit, comprising:
    a copy-back data cache;
    a load-store unit including an allocating load buffer, a non-allocating store buffer, and a priority control circuit to generate write-after-read hazards and read-after-write hazards to preserve the processing priority of entries within said allocating load buffer and said non-allocating store buffer; and
    a prefetch circuit to enqueue a prefetch command in said allocating load buffer and a store command in said non-allocating store buffer upon a write miss to said copy-back data cache, such that said priority control circuit forces a write-after-read hazard on said store command in said non-allocating store buffer, thereby forcing said prefetch command in said allocating load buffer to secure an allocated line in said copy-back data cache, allowing said store command of said non-allocating store buffer to write data to said allocated line.

2. The apparatus of claim 1 further comprising a copy-back buffer connected to said copy-back data cache.

3. The apparatus of claim 1 wherein said prefetch circuit includes an instruction unit to issue said prefetch command and said store command in an instruction issue pipeline stage.

4. The apparatus of claim 1 wherein said circuit forms a portion of a central processing unit.

5. The apparatus of claim 4 further comprising a system bus connected to said central processing unit, said system bus including a plurality of input/output controllers connected thereto.

6. A method of processing a copy-back data cache write miss, said method comprising the steps of:
    enqueuing a prefetch command in an allocating load buffer and a store command in a non-allocating store buffer in response to a copy-back data cache write miss signal;
    applying a write-after-read hazard to said store command in said allocating load buffer;
    securing an allocated line in said copy-back data cache in response to said prefetch command in said allocating load buffer;
    removing said write-after-read hazard; and
    writing to said allocated line, data corresponding to said store command in said non-allocating store buffer.

7. The method of claim 6 wherein said enqueuing step is performed as a multistage pipeline operation.

8. The method of claim 6 wherein said securing step includes the step of evicting a line of data from said copy-back data cache to a copy-back buffer.

9. The method of claim 8 further comprising the step of transferring said line of data from said copy-back buffer to a primary memory.

10. A method of processing a copy-back data cache write miss, said method comprising the steps of:
    issuing a prefetch load command to an allocating load buffer, a store command to a non-allocating store buffer, and a copy-back data cache write request;
    writing data to said copy-back data cache in response to a copy-back data cache write hit signal that occurs while said allocating load buffer and said non-allocating store buffer are empty;
    enqueuing said prefetch load command into said allocating load buffer and said store command into said non-allocating store buffer in response to a copy-back data cache write miss signal;
    forcing a write-after read hazard on said store command in said non-allocating store buffer;
    processing previous entries in said allocating load buffer and said non-allocating store buffer;
    evicting a line from said copy-back data cache;
    securing an allocated line in said copy-back data cache in response to said prefetch command in said allocating load buffer;
    removing said write-after-read hazard from said store command in said non-allocating store buffer; and
    writing to said allocated line, data corresponding to said store command in said non-allocating store buffer.

11. The method of claim 10 wherein said evicting step includes the step of evicting said line to a copy-back buffer.

12. The method of claim 11 further comprising the step of transferring said line from said copy-back buffer to a primary memory.

* * * * *